Figure 1:
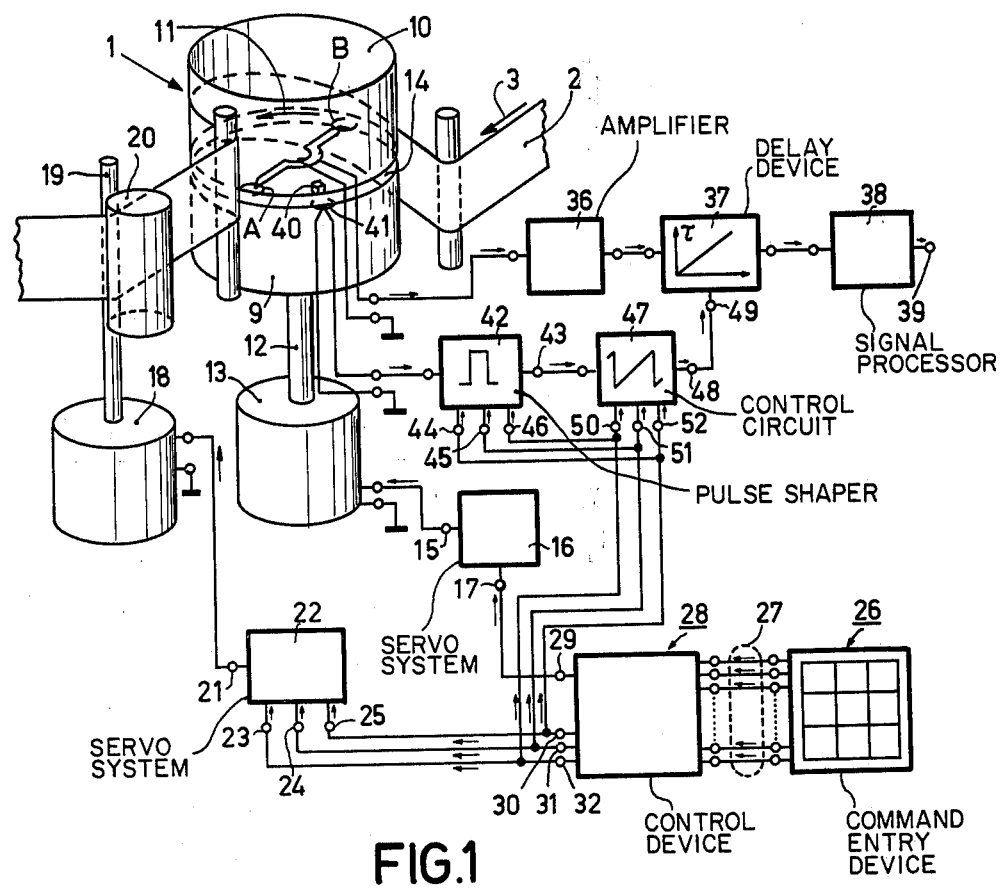

United States Patent [19]

Melwisch et al.

[11] 4,283,744
[45] Aug. 11, 1981

[54] VIDEO REPRODUCING APPARATUS WITH VARIABLE DELAY MEANS

[75] Inventors: Harald E. Melwisch; Dietfried Süsz, both of Vienna, Austria

[73] Assignee: U.S. Philips Corporation, New York, N.Y.

[21] Appl. No.: 77,957

[22] Filed: Sep. 24, 1979

[30] Foreign Application Priority Data

Oct. 3, 1978 [AT] Austria ................................ 7119/78

[51] Int. Cl.³ .............................................. H04N 5/78
[52] U.S. Cl. ........................................ 360/10; 360/36
[58] Field of Search ............................ 360/36, 10, 26; 179/15.55 T

[56] References Cited

U.S. PATENT DOCUMENTS

| | | | |
|---|---|---|---|
| 3,742,132 | 6/1973 | Sangrus | 360/36 |
| 3,763,317 | 10/1973 | Coleman | 360/36 |
| 3,851,100 | 11/1974 | Herzog | 360/36 |
| 3,855,424 | 12/1974 | Thormaritnam | 360/10 |
| 3,921,202 | 11/1975 | Damn | 358/8 |
| 3,939,485 | 2/1976 | Amari | 358/4 |
| 3,959,815 | 5/1976 | Rotter | 360/36 |
| 4,007,482 | 2/1977 | Amari | 358/4 |
| 4,007,484 | 2/1977 | Amari | 358/8 |
| 4,135,215 | 1/1979 | Fearnside | 360/36 |
| 4,165,521 | 8/1979 | Watanabe | 360/10 |

FOREIGN PATENT DOCUMENTS 567218  7/1977  U.S.S.R. ............................. 360/36

Primary Examiner—James W. Moffitt
Assistant Examiner—Alan Faber
Attorney, Agent, or Firm—Thomas A. Briody; William J. Streeter; Algy Tamoshunas

[57] ABSTRACT

A reproducing apparatus for television signals recorded on a magnetizable record carrier in the form of a tape comprises a rotatable transducer arrangement which for reading television signals which are recorded in adjacent oblique tracks which extend parallel to each other carries two magnetic heads of mutually different azimuth angles, whose azimuth angles correspond to the azimuth angles of the magnetic heads used during recording. In such an apparatus steps have been taken to ensure that during a mode of operation with stationary record carrier or with a record carrier speed deviating from the normal speed each of the two magnetic heads reads a track in which the television signals have been recorded with a magnetic head having the same azimuth angle as the magnetic head reading it. Furthermore, the signal path for the television signals being reproduced includes a delay device for said signals, which shifts the television signals corresponding to the consecutive fields in such a time relationship to each other that, without a phase jump between the horizontal synchronizing pulse trains of consecutive fields, the differences in the time intervals between every two consecutive vertical synchronizing pulses of each field are zero or a minimum respectively.

3 Claims, 11 Drawing Figures

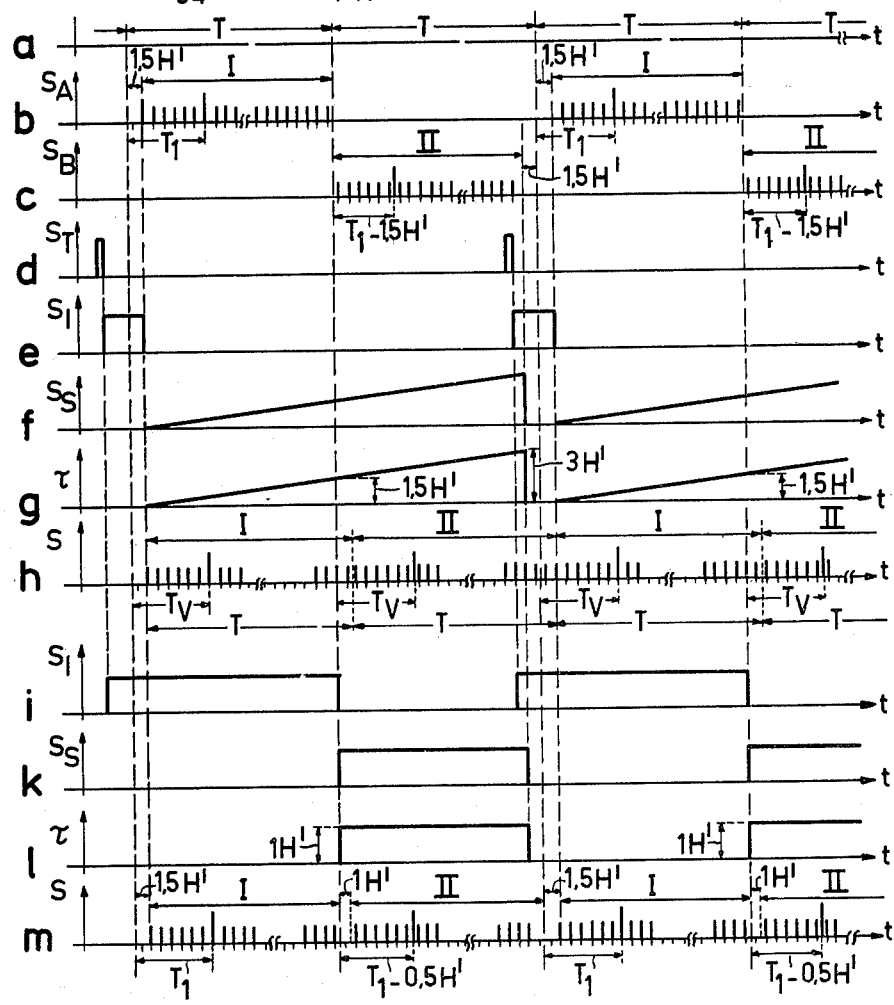

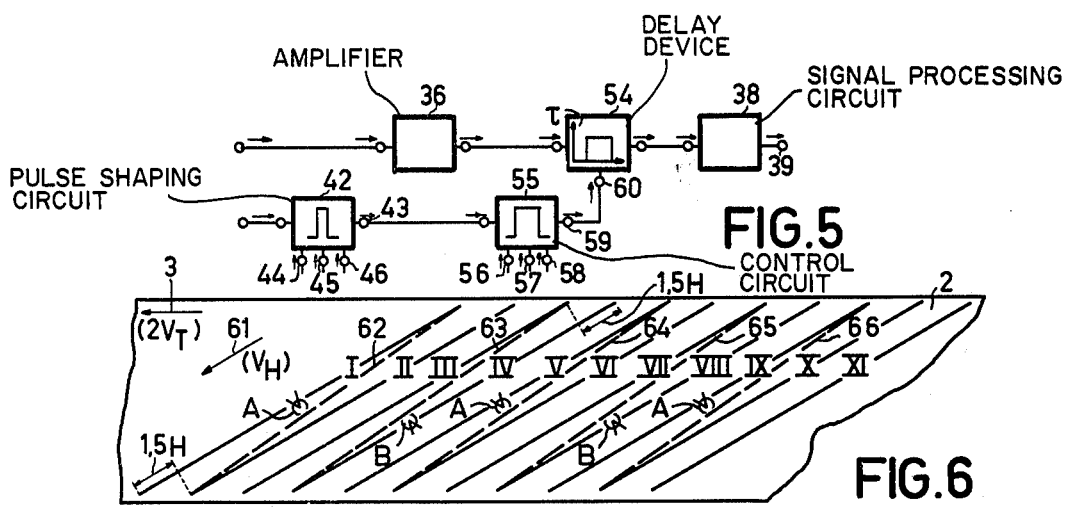

VIDEO REPRODUCING APPARATUS WITH VARIABLE DELAY MEANS

The invention relates to a reproducing apparatus for television signals recorded on a magnetizable record carrier in the form of a tape. The signals are recorded on the record carrier, which during the recording of the television signals is movable with a predetermined normal speed, in adjacent mutually parallel oblique tracks, each containing one field of the television signal. Recording is effected by two magnetic heads of a rotatable transducer arrangement which have mutually different azimuth angles and which during recording consecutively cover adjacent tracks. The sectors of the individual line intervals in adjacent tracks are in line with each other in a direction perpendicular to the tracks with a line offset corresponding to a predetermined number of line intervals between the beginning and the end of adjacent tracks. The reproducing apparatus comprises a rotatable transducer arrangement which carries two magnetic heads having mutually different azimuth angles for reading the television signals recorded in the tracks, which azimuth angles correspond to the azimuth angles of the magnetic heads used during recording. Such an apparatus is known from German application No. 24 36 941 corresponding to U.S. Pat. Nos. 4,007,482 and 4,007,484.

Such a reproducing apparatus usually enables television signals on the record carrier to be read and reproduced in a mode of operation with the same predetermined normal speed of the record carrier with which said record carrier was driven during the recording of the television signals. However, it is frequently desirable to reproduce the recorded television signals in a mode in which the record carrier is stationary or in which the speed of transport of the record carrier deviates from the predetermined normal speed, in order to obtain on the screen of a television receiver a stationary picture or a picture with slower or faster motion than in the original. In an apparatus of the type mentioned in the opening paragraph, which comprises magnetic heads with different azimuth angles, these modes of operation are obtained, in accordance with the invention, in that in a selected mode with a stationary record carrier or with a speed of transport of the record carrier which deviates from the normal speed each of the two magnetic heads reads a track in which the television signals have been recorded with a magnetic head having the same azimuth angle as the magnetic head reading it, that the signal path for the television signals being reproduced includes a delay device for said signals, and that there is provided a control signal circuit for said delay device, which depending on the selected mode, on the magnetic head instantaneously reading a track, and on the line offset existing between adjacent tracks supplies a control signal for controlling the delay of the delay device to this device said device shifting the television signals corresponding to the consecutive fields in such a time relationship to each other that, without a phase jump between the horizontal synchronizing pulse trains of consecutive fields, the differences of the time intervals between every two consecutive vertical synchronizing pulses of each field are zero or a minimum respectively.

As in modes of operation with a speed of transport of the record carrier which deviates from the normal speed the two magnetic heads again read those tracks in which the television signals have been recorded with a magnetic head having the same azimuth angle, these tracks will be situated more or less adjacent each other. Owing to the line offset between said tracks and the changed scanning conditions for said tracks the reproduced television signals will exhibit time errors, but by means of the delay device these can be compensated for or reduced so that they are no longer annoying. This also ensures in a particularly simple manner that in a mode with a speed of transport of the record carrier deviating from the normal speed television signals reproduced by means of two magnetic heads of mutually different azimuth angles exhibit no or only such small deviations from a standard television signal that they can be reproduced satisfactorily by a television receiver without picture or synchronization faults. It is to be noted that in order to ensure that the magnetic heads each time read the correct tracks steps may be used as employed in apparatus with such modes of operation but with magnetic heads whose azimuth angles do not differ. As an example, in accordance with said steps, each of the two magnetic heads may be mounted on the rotary transducer arrangement by means of a support which is adjustable in a piezo-electric manner, the adjustment of said support enabling the magnetic head mounted on it to be positioned on a track to be read by said magnetic head, as is for example described in DE-OS No. 26 46 449 corresponding to U.S. Pat. No. 4,165,521. However, alternatively each of the two magnetic heads may have such a width that at any rate it covers a track which can be read by this head, whilst during playback the magnetic head may at least partly cover further tracks, but does not reproduce the signals recorded therein because of the deviating azimuth angle.

It is found to be particularly advantageous if as delay device there is provided such a device with a continuously variable delay and if the control signal circuit supplies a control signal to the delay device, which signal is sawtooth-shaped during one field for the linearly varying the delay, said device shifting the television signals corresponding to consecutive line intervals and fields in such a time relationship to each other that both the consecutive vertical synchronizing pulses of each field and the consecutive horizontal synchronizing pulses of each line interval are spaced at equal time intervals from each other in conformity with a standard television signal. This ensures that the reproduced television signal is in conformity with a standard television signal both in respect of the vertical synchronizing pulses and of the horizontal synchronizing pulses. In this way bouncing of the picture as a result of a disturbed vertical synchronizing signal, as well as faults at the location of horizontal colour transitions in a colour television signal as a result of a disturbed horizontal synchronizing signal are avoided.

It is found to be advantageous if as delay device there is provided such a device whose delay is variable in steps and if the control signal circuit supplies a pulse-shaped control signal which is constant during one field to the delay device for the stepwise variation of the delay, said delay device shifting the television signals corresponding to the consecutive fields in such a time relationship to each other that the differences in the time intervals between every two consecutive vertical synchronizing pulses of each field are a minimum. Thus it is achieved that both the delay device and the control signal circuit can be realized in a particularly simple and inexpensive manner and that despite the simple construction especially those faults which are caused by an excessively disturbed vertical synchronizing signal and which are particularly annoying, namely bouncing of the picture reproduced by a television receiver, are avoided.

The invention will be described in more detail with reference to the drawings which show embodiments given by way of non-limitative example.

FIG. 1 partly schematically and in block-schematic form shows the parts which are essential for the present invention of a reproducing apparatus for television signals recorded on a record carrier in the form of a tape. The apparatus comprises a rotary transducer arrangement having two magnetic heads with mutually different azimuth angles, and a delay device with a continuously variable delay for the reproduced television signals.

Figure 2:
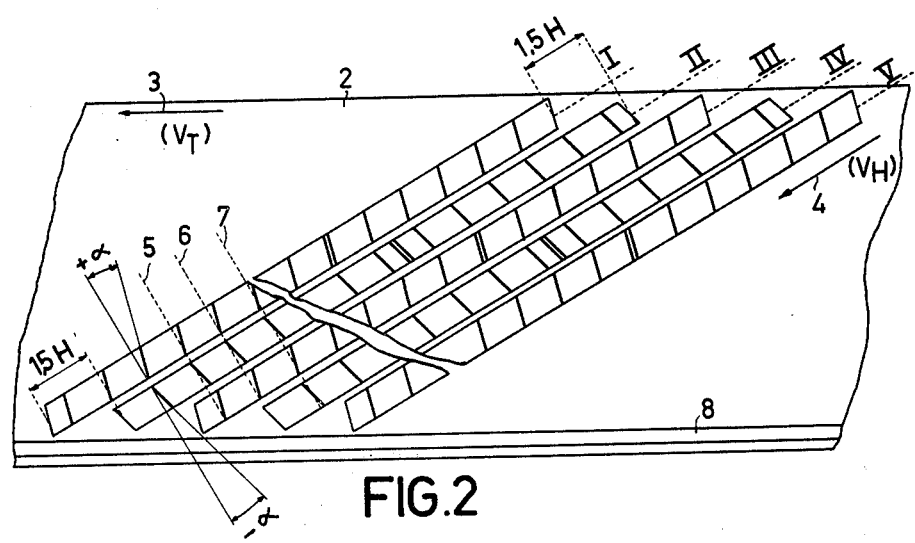

FIG. 2 schematically represents the tracks recorded on a record carrier in the form of a tape, in which tracks television signals are stored.

FIG. 3 schematically represents the tracks recorded on a record carrier by solid lines and the scanning paths covered by the magnetic heads of the rotary transducer arrangement of the apparatus of FIG. 1 during reproduction of the recorded television signals in a mode in which the record carrier is stationary by dashed and dotted lines respectively.

In the diagrams of FIGS. 4a to 4b FIG. 4 shows the signal and time relationships as occurring in an apparatus in accordance with FIG. 1 during the reproduction of television signals in a mode of operation with stationary record carrier.

FIG. 5 shows a circuit arrangement, which is a modification of the apparatus of FIG. 1, including a delay device with a delay which is variable in steps. The signal and time relationships occurring in an apparatus with the circuit arrangement of FIG. 5 are shown in FIG. 4 in the diagrams of FIGS. 4i to 4m.

FIG. 6, in a similar way as FIG. 3, shows the tracks recorded on the record carrier in solid lines and the scanning paths covered by the magnetic heads during reproduction of the recorded television signals in a mode of operation in which the record carrier is moved at twice the normal speed in dashed lines.

FIG. 7 in the diagrams of FIGS. 7a to 7h represents the signal and time relationships occurring in an apparatus of FIG. 1 during reproduction of television signals in a mode of operation in which the record carrier is moved at twice the normal speed.

The diagrams of FIGS. 7i and 7k show the variation of the delay of the delay device and the output signal of the circuit arrangement shown in FIG. 5 for a mode of operation in which the record carrier is moved at twice the normal speed.

Figure 8:
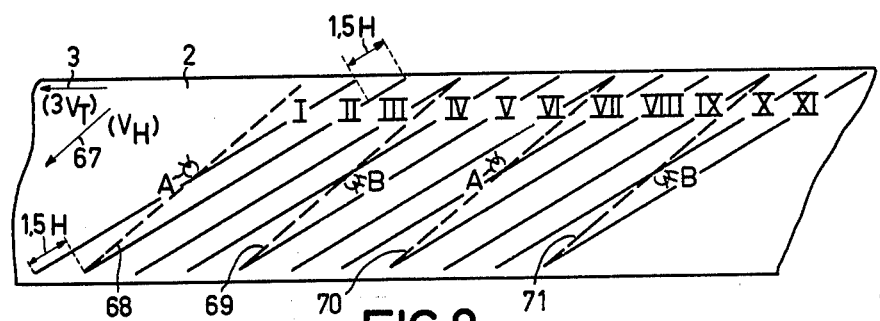

FIG. 8 in a similar way as FIGS. 3 and 6 shows the scanning paths in a mode of operation in which the record carrier is moved at three times the normal speed.

FIG. 9 again shows signal and time relationships occurring in an apparatus of FIG. 1 during the reproduction of television signals in a mode of operation in which the record carrier is moved at three times the normal speed.

Figure 10:
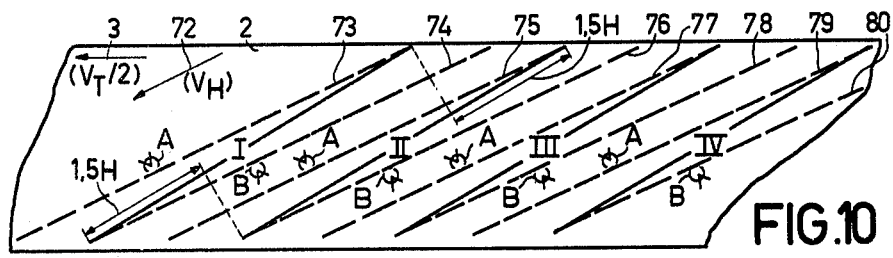

FIG. 10 in a similar way as FIGS. 3, 6 and 8 shows the scanning paths in a mode of operation in which the record carrier is moved at half the normal speed.

Figure 11:
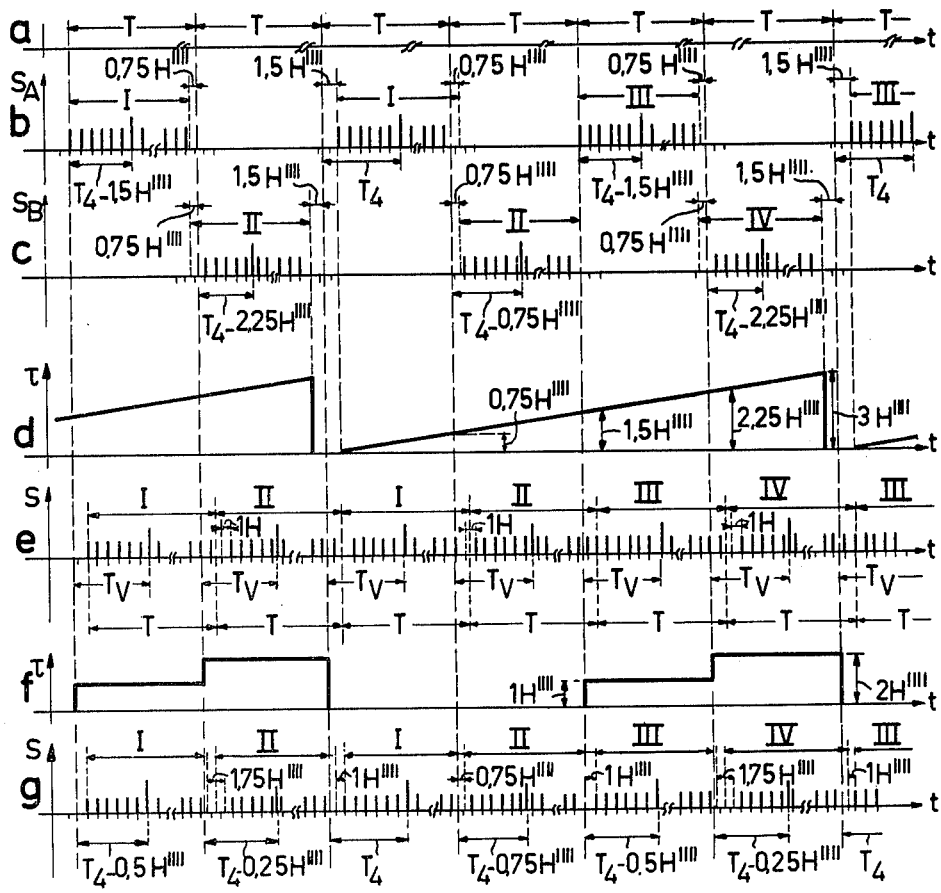

FIG. 11 in the diagrams of FIGS. 11a to 11e represents the signal and time relationships occurring in an apparatus in accordance with FIG. 1 for a mode of operation in which the record carrier is moved at half the normal speed, and the variation of the delay of the delay device and the output signal in an apparatus with the circuit arrangement of FIG. 5 in the diagrams of FIGS. 11f and 11g.

The reproducing apparatus shown in FIG. 1 is intended for the reproduction of television signals which have been recorded on a magnetizable record carrier 2 in the form of a tape in a manner which is apparent from FIG. 2. During recording, the television signals have been recorded on the record carrier 2 which is movable in the direction of the arrow 3 with a predetermined normal speed $v_T$, in adjacent oblique tracks I, II, III, IV, V etc. The tracks are parallel to each other and each track contains one field of the television signal. Recording is effected by a rotary transducer with two magnetic heads having mutually different azimuth angles $+\alpha$ and $-\alpha$. During recording the heads cover consecutive adjacent tracks in the direction of the arrow 4 with a speed $v_H$. The fact that recording magnetic heads have mutually different azimuth angles $+\alpha$ and $-\alpha$ is schematically indicated in FIG. 2 in that the positions of the synchronizing pulses of the television signal, which are represented by heavier lines, in adjacent tracks alternately have the azimuth angle $+\alpha$ and the azimuth angle $-\alpha$ and vice versa relative to the track normal. Moreover, it is to be noted that in FIG. 2 the horizontal synchronizing pulses are represented by a single heavier line and that the beginning of the vertical synchronizing pulses is represented by two adjacent heavier lines. In the present case it is assumed that the beginning of each vertical synchronizing pulse is situated at a distance of six line intervals from the beginning of the corresponding field. The length of the vertical synchronizing pulse is not represented in FIG. 2; normally it is 2.5 times one line interval.

As stated previously and shown in FIG. 2, each track I, II, III, IV, V etc. contains one field of the television signal, so that every second track I, III, V etc. begins with a full line interval of the television signal and terminates with a half line interval, whereas the intermediate tracks II, IV, VI etc. begin with a half line interval and end with a full line interval. As can be seen in FIG. 2, the sectors of the individual line intervals in adjacent tracks are aligned in a direction perpendicular to the tracks, as indicated by the dotted lines 5, 6 and 7 in FIG. 2. Furthermore, FIG. 2 shows that between adjacent tracks at the beginning and at the end thereof there is a line offset corresponding to a predetermined number of line intervals. This line offset, which in the present case is 1.5 line intervals is dictated by predetermined parameters of the apparatus, such as the speed of transport of the record carrier during recording, the speed of rotation of the magnetic head during recording, the construction of the rotary transducer arrangement etc. As further shown in FIG. 2, the record carrier also contains at least one further track 8 which extends in the longitudinal direction of the record carrier. This track may serve for storage of audio signals or the storage of synchronizing signals that may be utilized in order to obtain a constant speed of transport of the record carrier during reproduction of the recorded television signals.

As can be seen in FIG. 1, the record carrier 2 in the reproducing apparatus 1 is passed over the surfaces of two coaxially disposed drum halves 9 and 10 in a helical path through an angle of 180°. The drum half 9 is stationary whereas the drum half 10 is rotatable in an anticlockwise direction shown by arrow 11. For this purpose the drum half 10 is mounted on a shaft 12, which is connected to a motor 13. Between the two drum halves is a gap 14 from which project two magnetic heads A and B on the rotatable drum half 10. In this way the drum half 10 and the two magnetic heads A and B constitute a rotatable transducer arrangement, the magnetic heads scanning oblique paths on the record carrier 2. Because of the diametrical arrangement of the magnetic heads and the selected 180° wrap of the record carrier around the two drum halves 9 and 10, in principle only one magnetic head is in operative contact with the record carrier during a scanning period T, because the one magnetic head comes into contact with the record carrier when the other magnetic head leaves the record carrier after a completed scan. The two magnetic heads A and B which read the television signals recorded on the record carrier in the tracks I, II, III, IV, etc. have different azimuth angles $+\alpha$ and $-\alpha$ in a similar way as the magnetic heads used for recording the television signals. In the present case and also in the rest of the description it has been assumed that the magnetic head A has the azimuth angle $+\alpha$ and the magnetic head B has the azimuth angle $-\alpha$, so that the magnetic head A can only read signals from the tracks I, III, V etc. and the magnetic head B only signals from the tracks II, IV, VI etc.

As stated previously, motor 13 drives the two magnetic heads A and B mounted on the drum half 10. The motor 13 is connected to the output 15 of a servo system 16, to a control input 17 of which an appropriate control signal can be applied for switching on or off the motor. In its switched-on condition the servo system in known manner ensures that the motor always has a predetermined constant speed of rotation, which determines the speed of rotation of the two magnetic heads A and B. This speed is defined so that during reproduction of the television signals recorded on the record carrier 2 the magnetic heads A and B scan the record carrier with the same speed $v_H$ as the magnetic heads which were used for recording. Since the two magnetic heads are always driven with the same speed, and independently of the speed of the record carrier, the scanning periods T during which the magnetic heads consecutively contact the record carrier are always of the same length. The scanning periods T of the two magnetic heads then follow each other without interruption, because at the very instant that one magnetic head is lifted off the record carrier the other magnetic head comes into contact with the record carrier.

The record carrier 2 is transported in the direction of the arrow 3 with a speed, which differs depending on the mode of operation to which the apparatus is set, by a drive shaft 19 which is rotated by a further motor 18. The record carrier 2 is pressed against the shaft by the pressure roller 20. The motor 18 is connected to an output 21 of a further servosystem 22. The servosystem 22, also in known manner, ensures that the speed of the motor 18 and thus of the drive shaft 19 is constant, so as to maintain the constant speed of transport of a record carrier 2. The servosystem 22 has three control inputs 23, 24 and 25, via which the servo system can be controlled so that, depending on the selected mode of operation of the reproducing apparatus in relation to the speed of transport of the record carrier, it can provide different constant speeds of the motor 18 and thus different constant speeds of record carrier transport. In the present case the three control inputs are controlled in a binary manner, so that via these inputs it is possible to obtain a maximum of eight operating conditions in the servosystem 22 corresponding to eight modes of operation of the reproducing apparatus. In this way it is for example possible to realize modes of operation with the reproducing apparatus 1 in which the record carrier is stationary, with normal speed $(v_T)$, which was also used during the recording of the television signals, with twice or three times the normal speed $(2v_T, 3v_T)$ or with half the normal speed $(v_T/2)$. As is known, these modes of operation correspond to still, normal, fast-motion and slow-motion reproduction.

Commands, for example, for selecting the mode of operation desired by the user with respect to the speed of transport of the record carrier, are supplied by an entry device 26 connected via a bus 27 of control lines to a control device 28. In the present case, the control device 28 comprises a microprocessor, which, via its outputs, transfers control signals to the apparatus parts to be controlled. Thus, the output 29 of the control device 28 is connected to the control input 17 of the servosystem 16 and the outputs 30, 31 and 32 thereof are connected to the control inputs 23, 24 and 25 of the further servosystem 22.

If a mode of operation is selected in which the record carrier is stationary or the record carrier has a speed of transport which deviates from the normal speed $v_T$, the scanning conditions for the two magnetic heads A and B relative to the tracks recorded on the record carrier, as is known, differ from those during reproduction in the mode in which the record carrier is moved with the normal speed $v_T$. In the present reproducing apparatus steps have been taken to ensure that each magnetic head reading a track in which the television signals have been recorded has the same azimuth angle as the magnetic head used for recording that track. This may for example be achieved by mounting each of the two magnetic heads A and B on a support which is adjustable in a piezo electric manner so that it is continously positioned on a track to be read. Such an arrangement is for example described in DT-OS No. 26 46 449. The two magnetic heads, as shown in FIG. 3 for the mode of operation with a stationary record carrier, each cover a scanning path 33 or 34, indicated in FIG. 3 by dotted lines, which in the present case cover the tracks I and II recorded on the record carrier. Another possibility is to use two magnetic heads of a width which is greater than the width of the individual tracks. Although with such an arrangement the heads may at least partly cover tracks adjacent to the one being read, the signals recorded on the adjacent tracks would not be reproduced because of the different azimuth angle. FIG. 3 shows this variant for the mode with stationary record carrier, in which case the scanning path 35 covered by the two magnetic heads and situated between the two tracks I and II recorded on the record carrier is schematically represented by a dashed line. When magnetic head A having an azimuth angle $+\alpha$ scans the scanning path 35 in the scanning period T, it also scans the tracks I and II because of its width. As the television signal stored in track I has also been recorded with a magnetic head having the azimuth angle $+\alpha$, the television signal recorded in track I is read during scanning period T because of the corresponding azimuth angle of the magnetic head A, while the television signal recorded in the track II is not read because of the deviating azimuth angle of the magnetic head A. When during the next scanning period T the magnetic head B having an azimuth angle $-\alpha$ scans the record carrier along the scanning path 35, the television signal contained in the track II is read, whereas the signal stored in the track I is not read. It is to be noted that the position of the scanning path 35 between the two tracks I and II can for example be attained by advancing the record carrier by a separate device, not shown, until the desired position of the scanning path 35 is obtained after the record carrier is brought to a stop by stopping motor 18 of the drive shaft 19.

As further shown in FIG. 1, an amplifier device 36 is connected to the magnetic heads A and B amplifies the television signals which have been read from the record carrier and which are generally available in frequency-modulated form and, removes from the signals annoying noise components. The amplifier 36 36 is followed by a delay device 37 whose construction and operation is described hereinafter. The delay device 37 is connected to a signal processing device 38, which is adapted to recover a television signal that can be reproduced with a television receiver from the signals reproduced by the magnetic heads A and B and on whose output 39 such a television signal is then available.

The rotary drum half 10 accommodates a permanent magnet 40, which during each revolution of the rotatable transducer arrangement produces a pulse in a stationary magnetic head 41 mounted near the path of the magnet 40, the occurrence of the pulse being in a fixed relationship to the positions of the two magnetic heads A and B. Connected to the magnetic head 41 is a pulse shaper stage 42, which, depending on the pulses induced in the magnetic head 41, produces control pulses on its output 43 whose duration depends on the selected mode of operation selected. The duration of the control pulses is defined by signals appearing on three control inputs 44, 45 and 46 of the pulse shaper stage 42 depending on the selected mode of operation of the apparatus, which signals are available on the outputs 30, 31 and 32 of the control device 28. Connected to the output 43 of the pulse shaper stage 42 is a control signal circuit 47, whose output 48 is connected to a control input 49 of the delay device 37. The control signal circuit 47 comprises three control inputs 50, 51 and 52, which are also connected to the outputs 30, 31 and 32 of the control device 28, so that the control signal available on output 48 of the control signal circuit 47 can be influenced depending on the selected mode of operation. As explained hereinafter with reference to the individual modes of operation of the apparatus, the control signal circuit 47, supplies a control signal to the delay device 37 which controls the delay in dependence on the selected mode of operation, on the magnetic head which is instantaneously reading a track and on the line offset between adjacent tracks. In response to the control signals, the delay device 37 shifts the television signals corresponding to the consecutive fields in such a time relationship to each other that without a phase jump between the horizontal synchronizing pulse trains of consecutive fields the differences in the time intervals between every two consecutive vertical synchronizing pulses of each field are zero. In the present case a delay device 37 is used with a continuously variable delay, which may, for example, be constituted by a so-called CCD circuit or a bucket brigade. The control signal circuit 47 is then formed so that it supplies a sawtooth-shaped control signal sawtooth-shaped during a specific time interval for linearly varying the delay $\tau$ of the delay device 37. The delay device 37 then shifts the television signals corresponding to the consecutive line intervals or fields in such a time relationship to each other that both the consecutive vertical synchronizing pulses of each field and the consecutive horizontal synchronizing pulses of each line interval are spaced at equal time intervals from each other in conformity with a standard television signal.

Referring to FIG. 1, the operation of the apparatus in the normal mode will now be described in which the record carrier is moved with the normal speed $v_T$ in the same way as during the recording of the television signals. After entry of the appropriate commands in the apparatus by means of the entry device 26, the control device 28 produces corresponding control signals on its outputs 29, 30, 31 and 32. In response to these control signals the servo system 16 ensures that the two magnetic heads are driven with a constant speed of rotation, namely so that the magnetic heads A and B scan the record carrier with the speed $v_A$. By means of these control signals the servo system 22 furthermore ensures that the record carrier is moved with the normal speed $v_T$ and that both the pulse shaper stage 42 and the control signal circuit 47 supply no output signal, the delay device 37 then remaining inoperative. In this case the magnetic heads A and B consecutively scan the tracks I, II, III etc. and reproduce the television signals recorded in these tracks in exactly the same way as they have been recorded. The fields recorded in the tracks then adjoin each other continuously without the occurrence of time errors, because at the instant that the magnetic head A completes the scanning of track I, the magnetic head B begins to scan track II etc. The television signals obtained by means of the magnetic heads A and B are amplified in the amplifier device 36 and without being delayed in the delay device 37 they are applied to the signal processing device 38, on whose output 39 television signals suitable for reproduction by a television receiver are available.

Referring to FIGS. 1, 3 and 4, the following is a description of the operation in the still picture mode in which the recorded television signals are reproduced with a stationary record carrier 2. Because the record carrier is stationary, the scanning conditions change basically as is known, because without the additional steps described in DT-OS No. 26 46 449, the magnetic heads A and B no longer tend to follow the record carrier in the direction of the recorded tracks I, II, III etc., but in a different direction, as is indicated by the scanning path 35 which is represented by a dashed line in FIG. 3 and extends in the direction of the arrow 53. Also in this mode of operation the servo system 16 ensures that the magnetic heads A and B scan the record carrier with the speed $v_H$, so that each magnetic head again cooperates with the record carrier for a scanning period T, the scanning periods of the two magnetic heads again adjoining each other without interruption, as shown in FIG. 4a. In respect to the scanning conditions in this mode of operation it is to be noted that, as is known, the magnetic heads for scanning a line interval which has been recorded in a time interval A during recording of a television signal require the time interval H', which in the present case is smaller than the time interval H, because in the same scanning period T a longer track is scanned.

As stated previously, the magnetic head A can only read television signals contained in the tracks I, III, V etc. and the magnetic head B only the television signals contained in the tracks II, IV, VI etc. because of the azimuth angles of the magnetic heads. In the present mode of operation, i.e. when the magnetic heads A and B scan the scanning path 35, the magnetic head A reads the television signal stored in the track I and the magnetic head B the television signal stored in the track II. The television signals read $S_A$ and $S_B$ are symbolically represented in FIGS. 4b and 4c. As is apparent from these two Figures and from FIG. 3, the magnetic head A, when it follows the scanning path 35, will not detect a recorded television signal in the track I at the beginning of its scanning period T for the duration of 1.5 H′, which is caused by the line offset of 1.5 H between the adjacent tracks I and II. After a scanning time $T_1$, which in the present case corresponds to 7.5 H′, the magnetic head A reads the beginning of the vertical synchronizing pulse of this field, which in FIG. 4b is indicated by a line of twice the length compared with the horizontal synchronizing pulses. At the end of the scanning period T of the magnetic head A the end of the field recorded in the track I is also reached, which field terminates with half a line interval. In contradistinction to the magnetic head A, the magnetic head B detects the beginning of the field stored in the track II at the beginning of its scanning period T when following the scanning path 35, which field begins with a half line interval. After a scanning time of $T_1 - 1.5$ H′ the magnetic head B reads the beginning of the vertical synchronizing pulse of this field. Just before the end of the scanning period T the end of the field recorded in the track II is scanned, which field ends with a full line interval. After this last line interval of the field stored in the track II the magnetic head B, as it follows the scanning path 35, detects no recorded television signal in the track II till the end of its scanning period T, namely also for a time 1.5 H′, which is again caused by the line offset of 1.5 H between the adjacent tracks I and II. After the magnetic head B the magnetic head A again cooperates with the record carrier for a scanning period T, which again at the beginning of its scanning period detects a signal gap for the duration of 1.5 H′ and which subsequently scans the field recorded in the track I. This process is continually repeated in this mode of operation.

Thus, as can be seen in FIGS. 4b and 4c, the television signals $S_A$ and $S_B$ read by the two magnetic heads contain time errors in comparison with a standard television signal. First of all the vertical synchronizing pulses are not spaced at equal time intervals from each other, which during the reproduction with a television receiver results in the picture synchronization being disturbed when said error is comparatively great. Secondly, the horizontal synchronizing pulses and thus the vertical synchronizing pulses have a frequency which deviates from a standard television signal, which is the result of the changed scanning time H′ for one line interval; this may give rise to faults at horizontal colour transitions during the reproduction of colour television signals. Furthermore, every field does not cover one full scanning period T. However, it is to be noted that during the continuous scanning of two adjacent tracks I and II or the scanning path 35, as described in the foregoing, in itself no phase jumps occur between the horizontal synchronizing pulse trains of the consecutively reproduced fields, as will be apparent from a comparison of the two FIGS. 4b and 4c.

In order to eliminate these fault components in the reproduced television signals, the signals are processed in the apparatus of FIG. 1 in a manner as described hereinafter. As stated, during each revolution of the magnetic heads A and B a pulse is induced in the magnetic head 41 by the magnet 40 which rotates along with the heads. As the inducing magnet 40 is situated in an exactly defined position relative to the magnetic heads, each of the resulting pulses constitutes an identification for the magnetic head which scans a track after the occurrence of the pulse and has a fixed time relationship to the scanning period T of the head. The signal $S_T$ formed by these pulses, which is shown in FIG. 4d, is applied to the pulse shaper stage 42, in which the signal shown in FIG. 4e is formed. This signal consists of control pulses whose leading edges are determined by the trailing edges of the pulses induced in the magnetic head 41 and whose trailing edges in turn coincide with the instants at which the magnetic head A each time scans the beginning of the field recorded in the track I. This instant occurs after a time interval defined by the line offset, in the present case 1.5 H′, after the beginning of the scanning period T of the magnetic head A, so that said instant depends on the line offset. The duration of these pulses is then determined by applying corresponding control signals from the control device 28 to the control inputs 44, 45 and 46 of the pulse shaper stage 42, which control signals, as stated, are supplied by the control device 28 in accordance with the mode of operation of the apparatus. The signal $S_I$ from the pulse shaper stage 42 is applied to the control signal circuit 47 and subsequently, under the influence of the control signals appearing on control inputs 50, 51, 52 which depend on the selected mode of operation, produces a control signal $S_S$ on output 48. Signal $S_S$ is then transferred to the delay device 37 and controls the delay $\tau$. The control signal $S_S$ formed by the control signal circuit 47, which is shown in FIG. 4f, has a periodic sawtooth-shape. The beginning of each sawtooth is defined by the trailing edge of each control pulse from the pulse shaper stage and the duration of each sawtooth is defined by the control signals applied to the control inputs 50, 51 and 52. The duration of each sawtooth is then defined so that the end thereof coincides with the instant at which the magnetic head B scans the end of the field stored in the track II. This instant occurs a time interval which depends on the line offset, in the present case 1.5 H′, before the end of the scanning period T of the magnetic head B, so that this instant is also dependent on the line offset. The control signals $S_S$ formed in the control signal circuit 47 is applied to the control input 49 of the delay device 37 for controlling the delay of said device. Because of this control signal which, as is apparent from the foregoing description of the generation of this signal from the pulses induced in the magnetic head 41 and the control pulses derived therefrom, depends on the selected mode of operation, on the magnetic head which each time scans a track, and on the line offset between two adjacent tracks, the delay $\tau$ of the delay device 36 will vary as shown in FIG. 4g, which corresponds to a sawtooth which linearly rises from a value zero to a value of 3 H′ and which extends over the portions of the scanning periods during which signals are read from the tracks I and II.

The television signals $S_A$ and $S_B$ read by the magnetic heads A and B and shown in FIGS. 4b and 4c are amplified in the amplifier device 36, after which they are applied to the delay device 37, whose delay $\tau$ varies as stated previously and as represented in FIG. 4b. As is evident from FIGS. 4b, 4c and 4g the delay device 37 provides such a delay of the signals $S_A$ and $S_B$ applied to it that the signal S shown in FIG. 4h is obtained. FIG. 4h shows that as a result of the corresponding linear increase of the delay the individual line intervals H' are continuously time-expanded to the value H, so that every field again covers a full scanning period T and the vertical synchronizing pulses occupy a position in conformity with the standard as in a standard television signal. The maximum value of the delay $\tau$ of 3 H' also ensures that the signal gap of in total 3H' at the transition from the field scanned from the track II to the field scanned from the track I is compensated for. Whereas with the time expansion the beginning of the fields read from the track II by the magnetic head B is each time delayed by a time 1.5 H', the vertical synchronizing pulses of all consecutive fields are now spaced at the same time intervals from the beginning of the scanning period T of both magnetic heads A and B, as is indicated in FIG. 4a by $T_V$. It follows that the vertical synchronizing pulses are spaced at equal time intervals relative to each other, which is in conformity with a standard television signal, because the time relationship of the horizontal synchronizing pulses also corresponds to that of a standard television signal.

Summarizingly, it is to be noted that the delay device has shifted the television signals read from the record carrier and corresponding to the consecutive line intervals and fields in such a time relationship to each other that both the consecutive vertical synchronizing pulses of each field as well as the consecutive horizontal synchronizing pulses of each line interval are spaced at equal time intervals from each other in accordance with a standard television signal. As is apparent from FIG. 4h, such a delay in the signal S does not result in a phase jump between the horizontal synchronizing pulse trains of consecutive fields, because the maximum delay of 3 H' is an integral multiple of one line interval H', and thus causes no change in this respect relative to the signals $S_A$ and $S_B$ read, between which there is neither a phase jump in the horizontal signal pulses. After its further processing in the signal processing circuit 38 such a television signal can be reproduced with a television receiver in a satisfactory manner and without faults. Thus, the steps in accordance with the invention ensure that television signals scanned from a stationary record carrier with the aid of two magnetic heads having mutually different azimuth angles can also be reproduced satisfactorily by means of a television receiver.

Hereinafter a simplified embodiment of the reproducing apparatus of FIG. 1 is described. To this end FIG. 5 shows the amplifier device 36 connected to the magnetic heads A and B, which is now followed by a delay device 54 whose delay $\tau$ is variable in steps. Such a delay device may for example simply be constituted by a delay line which can be switched in and out. Again the signal processing circuit 38 is connected to the delay device 54. For the stepwise control of the delay $\tau$ of the delay device 54 there is provided a control signal circuit 55, which is included after the pulse shaper stage 42, which circuit is adapted to receive control signals which are supplied by the control device 28 via control inputs 56, 57 and 58 and depend on the selected mode of operation. The control signal circuit 55 is adapted to form a pulse-shaped control signal which is constant during a field, which circuit supplies this signal to a control input 60 of the delay device 54 via its output 59.

If now in an apparatus including a circuit arrangement in accordance with FIG. 5 recorded television signals are reproduced in a mode of operation with stationary record carrier, the following situations occur which are described hereinafter with reference to FIGS. 4i to 4n. As a result of the pulses induced in the magnetic head 41 the pulse shaper stage 42 produces the pulse-shaped signal $S_I$ shown in FIG. 4i. This signal $S_I$ is applied to the control signal circuit 55, which subsequently supplies the control signal $S_S$. When this control signal is applied to the delay device 54 this results in a variation of the delay $\tau$ as represented in FIG. 4l. In this way the delay $\tau$ can be varied stepwise, approximating the sawtooth-shaped variation of FIG. 4g, from a value zero to a value 1 H' at the transition from the scan of the magnetic head H to the scan of the magnetic head B. The value of 1 H' for the delay is an integral multiple of H', so that again it causes no phase jump in the horizontal synchronizing pulse trains of consecutive fields but reduces the differences of the time intervals between the vertical synchronizing pulses of consecutive fields to a minimum.

The television signals $S_A$ and $S_B$ scanned by the magnetic heads A and B are applied to the delay device 37, which as can be seen in FIG. 4m causes the fields read by the magnetic head B to be delayed by a delay $\tau$ of 1 H', whilst the fields read by the magnetic head A are transferred without delay. This yields a television signal S, in which the vertical synchronizing pulses are not spaced at equidistant time intervals, whilst nevertheless the delay device has shifted the television signals corresponding to consecutive fields in such a time relationship with respect to each other that the differences of the time intervals between every two consecutive vertical synchronizing pulses of each field are minimal. In the present case these differences, as can be seen in FIG. 4m, are each time 0.5 H', so that they have been reduced by 1 H'; such an error is no longer regarded as disturbing. In this case it is to be noted that in the signal of FIG. 4m the horizontal synchronizing pulses are not spaced at intervals in conformity with a standard television signal, because said interval is H'. The horizontal synchronizing pulse trains of consecutive fields, however, again follow each other without phase jumps. In the present signal there are also signal gaps between the television signals read from the tracks corresponding to consecutive fields, whose duration is alternately 1 H' and 1.5 H', as is shown in FIG. 4m. Because of the timing of said signal gaps relative to the vertical synchronizing pulses, these signal gaps are restricted to a part of the screen of a television receiver which is not visible to the viewer, so that the signal gaps cannot produce any disturbing effect. Summarizingly, it is to be noted in the present case that the signal shown in FIG. 4m after its further processing in the signal processing circuit 38 can be reproduced in a satisfactory manner on a television receiver, because as a result of the minimal deviations of the television signals from a standard television signal practically no disturbing effects occur which are discernible by the user.

Referring to FIGS. 1, 6 and 7, the case is described hereinafter that by means of the apparatus of FIG. 1 the television signals recorded on the record carrier 2 are reproduced in a mode of operation in which the record carrier is moved at twice the normal speed. Because of the principle the scanning conditions for the magnetic heads A and B in this case also differ with respect to normal reproduction, because without additional steps the magnetic heads again tend to scan the record carrier 2 in the direction, indicated in FIG. 6 by the arrow 61, which deviates from the recorded tracks I, II, III, IV etc., the speed of the magnetic heads again having the value $v_H$. Consequently, each of the two magnetic heads A and B again scans the record carrier for a scanning period T, whilst in this case because of the obtaining scanning conditions each magnetic head requires a time H' for scanning one line interval, which time as is known is greater than the time H required for recording one line interval, because in the same scanning period T a shorter track is scanned. In the present mode of operation the magnetic heads A and B consecutively follow the scanning paths 62, 63, 64, 65, 66 etc. represented by dashed lines in FIG. 6. Because of the obtaining situation in respect of the azimuth angles of the magnetic heads the magnetic head A scans the track I, and the magnetic B the track IV, then the magnetic head A the track V, then the magnetic head B the track VIII, then the magnetic head A the track IV 9 etc. in the consecutive scanning periods T.

The signals $S_A$ and $S_B$ read by the magnetic heads A and B are shown in FIGS. 7b and 7c. As can be seen in FIG. 7b, the magnetic head A, because of the scanning conditions obtaining, reads the beginning of the field stored in the track I at the beginning of its scanning period T, but the last 1.5 line interval of the field stored in the track I is no longer read because of the position of the scanning path 62 relative to the track I. In the subsequent scanning period T the magnetic head B in a similar way does not read the first 1.5 line intervals of the field stored in the track IV because of the position of the scanning path 63 relative to the track IV. At the end of the scanning period T of the magnetic head B said head, as it follows the scanning path 63, reads the end of the field stored in the track IV. What has been stated for tracks I and IV also applies to the last 1.5 line interval of track V with respect to the magnetic head A and to the first 1.5 line interval of the track VIII with respect to the magnetic head B. In respect of the vertical synchronizing pulses it is to be noted that in respect of the beginning of the scanning periods T these pulses do not occur at equal time intervals, but alternately appear after a time interval $T_2$ and $T_2 - 1.5$ H'', which corresponds to a time error component of 1.5 H''. The horizontal synchronizing pulse trains of consecutive fields again adjoin each other without any phase jumps.

In order to recover a signal which is in conformity with a standard television signal from the signals $S_A$ and $S_B$ shown in FIGS. 7b and 7c, these signals are applied to the delay device 37, which shifts the television signals corresponding to the consecutive line intervals and fields in an appropriate manner. For this purpose a control signal from the control signal circuit 47 is again applied to the delay device 37, which signal is obtained in a similar way as described with reference to FIGS. 1, 3 and 4 for the mode of operation with a stationary record carrier. FIG. 7d again represents the pulses induced in the magnetic head 41, which identify the magnetic head which instantaneously reads a track. These pulses are applied to the pulse shaper stage 42, which depending on these pulses and the control signals on its control inputs 44, 45 and 46, which in the present case depend on the mode of operation with twice the normal speed of the record carrier, generates the pulse-shaped signal $S_I$ shown in FIG. 7e. This signal $S_I$ is applied to the control signal circuit 47, which depending on the signal $S_I$ applied to it and the control signals appearing on its control inputs 50, 51 and 52, which signals depend on the selected mode of operation, produces a sawtooth-shaped control signal $S_S$ on its output 48 for linearly varying the continuously variable delay $\tau$ of the delay device, which signal is represented in FIG. 7f. As a result of this control signal $S_S$ the delay $\tau$ varies as shown in FIG. 7g, which now corresponds to a sawtooth which linearly decreases from the value 3H'' to the value zero during two scanning periods T. Such a variation of the delay results in the individual line intervals being reduced from the value H'' to the value H, so that the television signal corresponding to a complete field again covers one full scanning period T and the vertical synchronizing pulses occupy their standard positions. As the maximum delay is an integral multiple of H'', it is again ensured that no phase jump is introduced into the horizontal synchronizing pulse trains of the television signals thus delayed, because in this respect there is no change with respect to the signals read $S_A$ and $S_B$, which neither exhibited a phase jump in respect of the horizontal synchronizing pulses.

Thus, with such a variation of the delay $\tau$ the delay device 37 shifts the television signals corresponding to the consecutive line intervals and fields so as to obtain such a time relationship to each other that both the consecutive vertical synchronizing pulses of each field and the consecutive horizontal synchronizing pulses of each line interval are spaced at equal time intervals from each other in conformity with a standard television signal. The signal S thus obtained from the signals read by the two magnetic heads A and B and shown in FIGS. 7b and 7c is shown in FIG. 7a. In respect of this signal it is to be noted that because of the delay introduced no television signal is available at the transition from the field read from the track I to that read from the track IV as well as at the transition from the field read from the track V to that read from the track VIII etc. for the duration of in total three line intervals. These signal gaps arise because the magnetic heads A and B, as a result of the scanning conditions in this mode of operation, cannot read the corresponding television signals as has already been explained with reference to FIGS. 7b and 7c. However, as these signal gaps are situated at a position in the television signal which is not visible on the picture screen of the television receiver, these signal gaps produce no annoying effects for the viewer of the television signal thus reproduced in the fast-motion mode.

If in an apparatus with a circuit arrangement in accordance with FIG. 5 the recorded television signals are reproduced in a mode of operation in which the record carrier is moved at twice the normal speed, the error component contained in the reproduced television signals in respect of the vertical synchronizing pulses can again be minimized, so that no impermissible faults arise in the reproduction with a television receiver. This this purpose, in a similar way as described previously, a pulse-shaped control signal is generated in the control signal circuit 55, which in the delay device 54 produces the delay $\tau$, as shown in FIG. 7i, which is variable in steps, which should again be regarded as an approximation to the sawtooth-shaped variation of FIG. 7g. For the scanning period of the magnetic head B of the delay $\tau$ then has the value 1H'. The delay device 54 then shifts the signals $S_A$ and $S_B$ reproduced by the magnetic heads A and B and shown in FIGS. 7b and 7c in a time relationship to each other which is apparent from the signal shown in FIG. 7k. In this signal the vertical synchronizing pulses are not spaced at a standard time interval from each other, but the differences of the time intervals between the consecutive vertical synchronizing pulses of each field have again been reduced to an acceptable minimum. In the present case these differences have the value 0.5H''. The horizontal synchronizing pulses then are not spaced at the standard time interval H, but at the time interval H'', which corresponds to the time interval required for reproducing one line interval in this mode of operation. However, in the signal S of FIG. 7k it is again ensured that the horizontal synchronizing pulse trains of consecutive fields adjoin each other without phase jumps, because the delay $\tau$ again corresponds to an integral multiple of the time interval H'', namely 1H''. The relevant signal S again exhibits signal gaps which have a duration of H'' corresponding to one line interval. These signal gaps appear at the transition from the field read from the track I to that read from the track IV as well as from the field read from the track V to that read from the track VIII etc., so that again they have no adverse effect. Such a signal can thus also be reproduced in a satisfactory manner by means of a television receiver.

Figure 9:
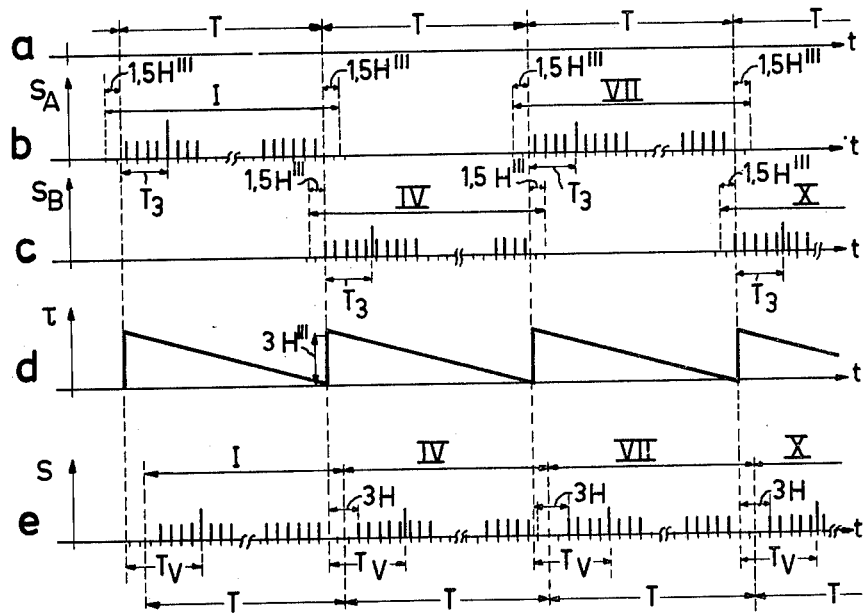

Referring to FIGS. 1, 8 and 9, the case is described hereinafter that by means of the apparatus of FIG. 1 the television signals stored on the record carrier are reproduced in a mode of operation in which the record carrier is moved at three times the normal speed. In this mode of operation the magnetic heads A and B, as a result of the changed scanning conditions, scan the record carrier with the speed $v_H$ in a direction which deviates from the tracks I, II, III etc. and which is indicated by the arrow 67 in FIG. 8, the magnetic heads A and B following the scanning paths 68, 69, 70, 71 etc., represented by dashed lines in FIG. 8, in consecutive scanning periods P. Because of the situation in respect of the azimuth angles of the magnetic heads A and B the magnetic head A reads the track I, then the magnetic head B the track IV, then the magnetic head A the track VII, then the magnetic head B the track X etc. in consecutive scanning periods P. With the scanning conditions obtaining in this mode of operation each magnetic head requires a time interval H''' for reading one line interval, which is again greater than the time interval H required for recording one line interval.

FIG. 9a shows the consecutive scanning periods T, FIG. 9b the signals read by the magnetic head A and FIG. 9c those read by the magnetic head B. Under the present scanning conditions, as is shown in FIGS. 9b and 9c, both the first 1.5 line intervals as well as the last 1.5 intervals of the television signals in tracks I, IV, VII, X etc. are not read by the magnetic heads A and B. Again, as is apparent from FIG. 8, this is owing to the position of the scanning paths 68, 69, 70, 71 etc. relative to the tracks I, II, III, IV etc. recorded on the record carrier. In respect of the vertical synchronizing pulse it is to be noted that in respect of the beginning of the scanning periods T all these pulses occur after a time interval $T_3$, so that they automatically are spaced at equal time intervals from each other, but in a similar way as the horizontal synchronizing pulses do not have the standard frequency.

In order to recover a signal corresponding to a standard television signal from the television signals read, the control signal circuit 47, in a similar way as described previously, supplies a sawtooth-shaped control signal to the delay device 37, which results in the sawtooth-shaped variation of the delay $\tau$ of the delay device 37 which decreases linearly from a value 3H''' to the value zero over one scanning period. For this variation of the delay $\tau$ the delay device 37 shifts the television signals corresponding to the consecutive line intervals and fields so as to obtain a time relationship to each other as shown in FIG. 9e. The signal S shown in FIG. 9e then again corresponds to a standard television signal, in which no phase jumps occur between the horizontal synchronizing pulse trains of consecutive fields, because again the maximum value of the delay $\tau$ of 3H''' is an integral multiple of one line interval H''', so that in this respect no change is introduced relative to the signals $S_A$ and $S_B$ being read, which neither exhibit any phase jumps in the horizontal synchronizing pulses. Between the consecutive fields signal gaps appear for a period of time equal to three line intervals, but again these are not visible during reproduction with a television receiver.

As stated, the vertical synchronizing pulses of the television signals reproduced by the magnetic heads A and B and shown in FIGS. 9b and 9c are inherently spaced at equal time intervals. Therefore, the television signals shown in the FIGS. 9b and 9c, when accepting the fact that the horizontal and vertical synchronizing pulses only deviate from a standard television signal in respect of the frequency, can also be applied directly to a television receiver for a satisfactory reproduction.

Hereinafter the case is described with reference to FIGS. 1, 10 and 11 that by means of an apparatus of FIG. 1 the recorded television signals are reproduced in a mode of operation in which the record carrier is moved at half the normal speed. In this mode of operation the magnetic heads A and B, owing to the changed scanning conditions, scan the record carrier 2 in the direction indicated by the arrow 72 in FIG. 10 which deviates from the direction of the recorded tracks I, II, III etc. with the spaced $v_H$. The magnetic heads A and B then consecutively follow the scanning paths 73, 74, 75, 76, 77, 78, 79, 80 etc. represented by dashed lines in FIG. 10. Because of the obtaining situation in respect of the azimuth angles of the magnetic heads A and B, the magnetic head A reads the track I, and the magnetic head B the track II, then the magnetic head A again the track I, then the magnetic head B again the track II, then the magnetic head A the track III, then the magnetic head B the track IV, then the magnetic head A again the track III etc. in consecutive scanning periods T. For reading one line interval a time interval H'''' is required in this mode of operation, which time interval is smaller than the period of time H required for recording one line interval.

FIGS. 11b and 11c show the signals $S_A$ and $S_B$ read by the magnetic heads A and B. At the beginning of the scanning periods T, when the magnetic head A follows the scanning path 73, this head begins to read the field stored in track I. The field recorded in track I ends a period of time corresponding to half the line offset between two recorded tracks before the end of the scanning period T of the magnetic A is reached, so that the magnetic head A no longer detects a television signal in the time interval 0.75H'''' before the end of its scanning period. In the next scanning period T the magnetic head B follows the scanning path 74, in which said head cannot read the television signal corresponding to the first 0.75 line interval, because of the position of a scanning path 64 relative to the recorded track II. When scanning of the scanning path 74 is terminated the magnetic head T detects no television signal to be read for a period of time of 1.5 line intervals, because of the premature ending of the track II. As the magnetic head A follows the scanning path 65 in the next scanning period T, said head again reading the track I, the magnetic head A detects no signal to be read for a period of time of 1.5 line intervals. At the end of this scanning period the magnetic head A cannot read the last 0.75 line intervals recorded in the track I, because of the position of the scanning path 75 relative to the track I to be scanned. At the beginning of the next scanning period T, in which the magnetic head B follows the scanning path 76 and reads the signal stored in the track II, the magnetic head B will detect no signal to be read for 0.75 line intervals because of the position of the scanning path 76 relative to the track II. At the end of this scanning period the magnetic head B reads the end of the field stored in the track II. The process described in the foregoing during reading of the television signal from the tracks I and II is repeated in a similar way during the next scanning periods when the television signals are read from the tracks III and IV.

In order to form a signal S corresponding to a standard television signal from the television signals $S_A$ and $S_B$ read by the magnetic heads A and B and shown in FIGS. 11b and 11c, the control device 42 applies a sawtooth-shaped control signal to the delay device 37, which controls the delay $\tau$ of a delay device in accordance with the variation shown in FIG. 11d. This variation corresponds to a sawtooth which increases linearly from a value zero to the value 3H'''', which sawtooth in the present case covers substantially four scanning periods. The maximum value of the delay $\tau$ is again an integral multiple of the line interval H'''', so that no phase jumps occur in the delayed horizontal synchronizing pulse trains, because in this respect no changes occur relative to the signals $S_A$ and $S_B$ read, between which neither any phase jumps occurred in respect of the horizontal synchronizing pulses. In the resulting signal S both the vertical synchronizing pulses and the horizontal synchronizing pulses are spaced at equal time intervals from each other in conformity with a standard television signal. The signal then exhibits signal gaps each time having the duration of one line interval, namely at the transitions from the field read from the track I to that read from the track II, from the track II to that from the track IV etc. However, again these signal gaps are not visible during reproduction with a television receiver.

When reproduction at half the normal speed of transport of the record carrier is effected in an apparatus including a circuit arrangement in accordance with FIG. 5, the error component contained in the signals $S_A$ and $S_B$ read from the record carrier in respect of the vertical synchronizing pulses are minimized in that the delay $\tau$ of the delay device 54 is controlled in accordance with FIG. 11f, which again should be regarded as an approximation to the sawtooth-shaped variation of FIG. 11d, in which after two scanning periods a jump to the value 1H'''' and after three scanning periods a further jump to the value 2H'''' occurs and in which owing to the integral multiple of the line interval H'''' it is again ensured that no phase jumps occur in the horizontal synchronizing pulse trains. In this case a signal is then obtained in which the differences of the time intervals between every two consecutive vertical synchronizing pulses of each field differ; however, these differences, which have values of 0.25H'''' and 0.75H'''' are again so small that such a signal can be reproduced with a television receiver without impairing the vertical synchronization. The signal gaps occurring in the signal S at the transitions from one field being read to the next field, having different durations of 1.75H'''', 1H'''' and 0.75H'''', again do not give rise to visible faults on the picture screen of a television receiver.

It is obvious that a series of further modifications to the embodiments described in the foregoing are possible, specifically as a result of a different choice of the apparatus parameters, such as for example the line offset. The same also applies in respect of the choice of the speed of transport of the record carrier for slow motion or fast motion. The case may then occur that in the television signal being read phase jumps occur between the consecutive horizontal synchronizing pulse trains, which may then be compensated for in a similar way by introducing delays whose magnitude and variation is in conformity with the time relationship of the signals being read; for this purpose it is for example possible to use a stepwise and sawtooth-shaped variation for the delay and the relevant delay may not be an integral multiple of the period of time required for reading one line interval.

What is claimed is:

1. An apparatus for reproducing television signals recorded on a magnetic tape by moving the tape at a predetermined speed past a rotatable transducer having a pair of magnetic heads with mutually different azimuth angles in a manner such that the television signal is recorded in parallel oblique tracks each containing one field of the television signal with sectors corresponding to individual line intervals of the television signal on adjacent tracks being aligned with each other in a direction normal to the tracks and the beginning and end of adjacent tracks being offset by a predetermined number of line intervals, said apparatus comprising a rotary transducer with two magnetic heads for reading the signal recorded on said tape, said two heads having mutually different azimuth angles corresponding to the azimuth angles of the pair of heads used for recording said signals, means for moving said tape past said rotary transducer, means for selectively controlling said tape moving means so as to stop movement of said tape or to move said tape at a speed which deviates from said predetermined speed depending on a mode of operation selected by the user, means coupled to said magnetic head for delaying, by a variable amount, signals read from said tape, and second means for controlling said delay means in dependence on the selected mode, on the line offset between adjacent tracks, and on the magnetic head instantaneously reading a given track so that the signals read from said tape which correspond to consecutive fields of said television signal are delayed by amounts such that the time intervals between every two consecutive vertical synchronizing pulses of each field are substantially equal and there is no phase jump between the horizontal synchronizing pulse trains of consecutive fields.

2. The apparatus according to claim 1 wherein said delay means delays said signals read from said tape by a continuously variable amount and said second means includes means for generating a sawtooth control signal during one field for linearly varying the amount by which the signals are delayed by said delay means.

3. The apparatus according to claim 1 wherein the amount by which the signals read from the tape are delayed by said delay means is variable in steps and said second means includes means for generating a pulse-shaped control signal which is constant during one field and which is applied to said delay means so as to vary in steps the amount by which the signals read from said tape are delayed.

* * * * *